(12) United States Patent
Wang et al.

(10) Patent No.: US 11,743,827 B2
(45) Date of Patent: Aug. 29, 2023

(54) INDICATOR AND DOWNLINK CONTROL CHANNEL DETECTION METHOD, EQUIPMENT AND APPARATUS

(71) Applicant: CHINA ACADEMY OF TELECOMMUNICATIONS TECHNOLOGY, Beijing (CN)

(72) Inventors: Lei Wang, Beijing (CN); Fang-Chen Cheng, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 265 days.

(21) Appl. No.: 16/646,557

(22) PCT Filed: Aug. 7, 2018

(86) PCT No.: PCT/CN2018/099264
§ 371 (c)(1),
(2) Date: Mar. 11, 2020

(87) PCT Pub. No.: WO2019/047659
PCT Pub. Date: Mar. 14, 2019

(65) Prior Publication Data
US 2020/0280921 A1 Sep. 3, 2020

(30) Foreign Application Priority Data

Sep. 11, 2017 (CN) .......................... 201710812717.X

(51) Int. Cl.
*H04W 52/02* (2009.01)
*H04W 72/23* (2023.01)

(52) U.S. Cl.
CPC ... *H04W 52/0248* (2013.01); *H04W 52/0216* (2013.01); *H04W 72/23* (2023.01)

(58) Field of Classification Search
None
See application file for complete search history.

(56) References Cited

U.S. PATENT DOCUMENTS

| 2015/0223254 A1 | 8/2015 | Guo et al. | |
| 2018/0262311 A1* | 9/2018 | Wang | H04L 5/0044 |
| 2020/0127760 A1* | 4/2020 | Jo | H04L 1/0057 |

FOREIGN PATENT DOCUMENTS

| CN | 105264995 A | 1/2016 |
| CN | 106793127 A | 5/2017 |

(Continued)

OTHER PUBLICATIONS

NTT Docomo, Inc. "Views on Contents of Group-Common PDCCH"; 3GPP TSG RAN WG1 Meeting #89; R1-1708468, May 15-19, 2017.

(Continued)

*Primary Examiner* — Saumit Shah
(74) *Attorney, Agent, or Firm* — KILPATRICK TOWNSEND & STOCKTON, LLP

(57) ABSTRACT

Disclosed in the present invention are a method, equipment and an apparatus for indicator and downlink control channel detection, comprising: determining data which must be transmitted to a terminal in one or more transmission time intervals by means of a downlink control channel; a base station sending a command to the terminal, used to indicate that the terminal determine according to the command whether it is necessary to detect a downlink control channel in the one or more transmission time intervals. On the terminal, determining according to the command whether it is necessary to detect a downlink control channel in the one or more transmission time intervals. After using the present invention, when a base station has not scheduled a terminal, this objectively causes a terminal side to not have excess (Continued)

power consumption, and lowers terminal-side power consumption.

12 Claims, 5 Drawing Sheets

(56) References Cited

FOREIGN PATENT DOCUMENTS

| | | | |
|---|---|---|---|
| CN | 108023714 A | 5/2018 | |
| WO | WO-2017095470 A1 * | 6/2017 | ........... H04L 5/0053 |
| WO | WO-2018031623 A1 * | 2/2018 | |

OTHER PUBLICATIONS

NTT Docomo, Inc. "Views on Common PDCCH"; 3GPP TSG RAN WG1 Meeting #88; R1-1702807, Feb. 13-17, 2017.

Samsung,"Functionalities for UE-Common NR-PDCCH", 3GPP TSG RAN WG1 #88bis, Spokane, USA, Apr. 3-7, 2017, total 4 pages, R1-1705378.

Wilus Inc.,"Discussion on blind decoding enhancement for NR-PDCCH",3GPP TSG RAN WG1 Meeting #89, Hangzhou, P.R. China, May 15-19, 2017, total 7 pages, R1-1708973.

* cited by examiner

INDICATOR AND DOWNLINK CONTROL CHANNEL DETECTION METHOD, EQUIPMENT AND APPARATUS

This application is a National Stage of International Application No. PCT/CN2018/099264, filed on Aug. 7, 2018, which claims priority to Chinese Patent Application No. 201710812717.X, filed to the China National Intellectual Property Administration on Sep. 11, 2017 and entitled "Indicator and downlink control channel detection method, equipment and apparatus", both of which are incorporated herein by reference in their entireties.

FIELD

The present disclosure relates to the technical field of wireless communications, and in particular to an indicator and downlink control channel detection method, equipment and apparatus.

BACKGROUND

The following briefly describes an existing Long Term Evolution (LTE) downlink control channel first.

1. PDCCH a Physical Downlink Control Channel (PDCCH) of an LTE system is used to carry scheduling information and other control information. There may be a plurality of PDCCHs in a control area of each downlink subframe. A size of the control area depends on a Physical Control Format Indicator Channel (PCFICH) that occupies 1 to 4 Orthogonal Frequency Division Multiplex (OFDM) symbols. Transmission of one control channel occupies one Control Channel Element (CCE) or a plurality of consecutive CCEs. Each CCE includes nine Resource Element Groups (REGs). REGs included in a CCE of a PDCCH do not include an REG that is configured to carry a Physical Control Format Indicator Channel (PCFICH) and a Physical Hybrid-ARQ Indicator Channel (PHICH). User equipment (UE) monitors a PDCCH candidate set at a non-discontinuous reception (non-DRX) subframe, that is, the UE attempts to decode each PDCCH in a search space according to a to-be-monitored Downlink Control Information Format (DCI format).

2. EPDCCH to expand a capacity of a PDCCH, an "Enhanced Physical Downlink Control Channel" (EPDCCH) is introduced into Rel-11. The EPDCCH is transmitted in a data area of a subframe without occupying a transmission space of the PDCCH. A terminal configured with an EPDCCH detects and receives an EPDCCH in a Physical Resource Block set (PRB set) configured in each subframe.

3. MPDCCH

EMTC (Enhanced MTC; MTC: Machine Type Communications) UE detects and receives an MTC PDCCH (MPDCCH) at one or more subframes configured at a higher layer.

Defects in the prior art are as follows:

in the current LTE system, a terminal needs to detect and receive a downlink control channel at all subframes in DRX ON states, thereby causing additional power consumption on a terminal side.

SUMMARY

The present disclosure provides a method, equipment and an apparatus for indicator and downlink control channel detection, to lower additional power consumption of a terminal side.

An embodiment of the present disclosure provides a downlink control channel detection method, including: receiving signaling sent to a terminal by a base station; and determining by the terminal, whether a downlink control channel needs to be detected within one or more Transmission Time Intervals (TTIs) according to the signaling.

In an implementation, the signaling is indicator information carried by a group common PDCCH.

In the implementation, the indicator information carried by the group common PDCCH is N-bit indicator information, and N is a positive integer greater than or equal to 1.

In an implementation, when N=1, if the indicator information is in a state 1, it indicates that the terminal needs to detect the downlink control channel within one or more TTIs; or if the indicator information is in a state 0, it indicates that the terminal does not need to detect the downlink control channel within one or more TTIs. Alternatively, when N>1, each bit of the N-bit information is used to indicate whether a downlink control channel within a TTI needs to be detected.

In the implementation, the signaling is indicator information sent at a specific resource location.

In the implementation, the signaling is indicator information sent at a specific resource location, wherein the specific resource location is configured by a base station for the terminal by using higher layer signaling.

In the implementation, when the signaling is the indicator information sent at the specific resource location, detecting the indicator information on the specific resource within each TTI or every M TTIs, to determine whether it is necessary to detect the downlink control channel, wherein M is an integer greater than 1.

In the implementation, the TTI is a slot or a mini-slot.

In the implementation, the indicator information is realized through independent coding; or the indicator information is processed in a same manner as the downlink control channel and transmitted in a PDCCH channel structure.

An embodiment of the present disclosure provides a method for indicating downlink control channel detection, including: determining data that needs to be transmitted to a terminal by using a downlink control channel within one or more TTIs; and sending, by a base station, signaling to the terminal, to indicate the terminal to determine, according to the signaling, whether it is necessary to detect the downlink control channel within one or more TTIs.

In an implementation, the signaling is indicator information carried by a group common PDCCH.

In the implementation, the indicator information carried by the group common PDCCH is N-bit indicator information, and N is a positive integer greater than or equal to 1.

In the implementation, when N=1, if the indicator information is in a state 1, it indicates that the terminal needs to detect the downlink control channel within one or more TTIs; or if the indicator information is in a state 0, it indicates that the terminal does not need to detect the downlink control channel within one or more TTIs. Alternatively, when N>1, each bit of the N-bit information is used to indicate whether a downlink control channel in a TTI needs to be detected.

In the implementation, the signaling is indicator information sent at a specific resource location.

In the implementation, the signaling is indicator information sent at a specific resource location, wherein the specific resource location is configured by a base station for the terminal by using higher layer signaling.

In the implementation, when the signaling is the indicator information sent at the specific resource location, the indicator information is detected on the specific resource within each TTI or every M TTIs, to determine whether it is necessary to detect the downlink control channel.

In the implementation, the TTI is a slot or a mini-slot.

In the implementation, the indicator information is realized through independent coding; or the indicator information is processed in a same manner as the downlink control channel and transmitted in a PDCCH channel structure.

An embodiment of the present disclosure provides user equipment, including: a transceiver, configured to receive and send data under the control of a processor, and perform the following process: receiving signaling sent to a terminal by a base station; and the processor, configured to read a program stored in a memory, and perform the following process: on the terminal, determining whether a downlink control channel needs to be detected within one or more TTIs according to the signaling.

In an implementation, the signaling is indicator information carried by a group common PDCCH.

In the implementation, the indicator information carried by the group common PDCCH is N-bit indicator information, and N is a positive integer greater than or equal to 1.

In the implementation, when N=1, if the indicator information is in a state 1, it indicates that the terminal needs to detect the downlink control channel within one or more TTIs; or if the indicator information is in a state 0, it indicates that the terminal does not need to detect the downlink control channel within one or more TTIs. Alternatively, when N>1, each bit of the N-bit information is used to indicate whether a downlink control channel in a TTI needs to be detected.

In the implementation, the signaling is indicator information sent at a specific resource location.

In the implementation, the signaling is indicator information sent at a specific resource location, wherein the specific resource location is configured by a base station for the terminal by using higher layer signaling.

In the implementation, when the signaling is the indicator information sent at the specific resource location, the indicator information is detected on the specific resource within each TTI or every M TTIs, to determine whether it is necessary to detect the downlink control channel.

In the implementation, the TTI is a slot or a mini-slot.

In the implementation, the indicator information is realized through independent coding; or the indicator information is processed in a same manner as the downlink control channel and transmitted in a PDCCH channel structure.

An embodiment of the present disclosure provides a base station, including: a processor, configured to read a program stored in a memory, and perform the following process: determining data that needs to be transmitted to a terminal by using a downlink control channel within one or more TTIs; and a transceiver, configured to receive and send data under the control of the processor, and perform the following process:

sending, by the base station, signaling to the terminal, to indicate the terminal to determine, according to the signaling, whether it is necessary to detect the downlink control channel within one or more TTIs.

In an implementation, the signaling is indicator information carried by a group common PDCCH.

In the implementation, the indicator information carried by the group common PDCCH is N-bit indicator information, and N is a positive integer greater than or equal to 1.

In the implementation, when N=1, if the indicator information is in a state 1, it indicates that the terminal needs to detect the downlink control channel within one or more TTIs; or if the indicator information is in a state 0, it indicates that the terminal does not need to detect the downlink control channel within one or more TTIs. Alternatively, when N>1, each bit of the N-bit information is used to indicate whether a downlink control channel in a TTI needs to be detected.

In the implementation, the signaling is indicator information sent at a specific resource location.

In the implementation, the signaling is indicator information sent at a specific resource location, wherein the specific resource location is configured by the base station for the terminal by using higher layer signaling.

In an implementation, when the signaling is the indicator information sent at the specific resource location, the indicator information is detected on the specific resource within each TTI or every M TTIs, to determine whether it is necessary to detect the downlink control channel.

In an implementation, the TTI is a slot or a mini-slot.

In an implementation, the indicator information is realized through independent coding; or the indicator information is processed in a same manner as the downlink control channel and transmitted in a PDCCH channel structure.

An embodiment of the present disclosure provides an apparatus for downlink control channel detection, including: a receiving module, configured to receive signaling sent to a terminal by a base station; and a detection module, configured to determine, on the terminal, whether a downlink control channel needs to be detected within one or more TTIs according to the signaling.

An embodiment of the present disclosure provides an apparatus for indicating downlink control channel detection, including:

a determining module, configured to determine data that needs to be transmitted to a terminal by using a downlink control channel within one or more TTIs; and a sending module, configured to send signaling to the terminal on a base station, to indicate the terminal to determine, according to the signaling, whether it is necessary to detect the downlink control channel within one or more TTIs.

An embodiment of the present disclosure provides a computer readable storage medium. The computer readable storage medium stores a computer executable instruction. The computer executable instruction is used to enable a computer to perform the method performed by the above terminal side.

An embodiment of the present disclosure provides a computer readable storage medium. The computer readable storage medium stores a computer executable instruction. The computer executable instruction is used to enable a computer to perform the method performed by the above base station side.

The present disclosure has the following beneficial effects:

in the technical solutions provided in the embodiments of the present disclosure, because the base station informs the terminal whether to detect the downlink control channel of scheduled data within one or more TTIs, the terminal can determine, according to the indicator information informed by the base station, whether to detect the downlink control channel of scheduled data within one or more TTIs. Therefore, when a non-DRX subframe is not scheduled, the terminal does not need to detect the downlink control channel in all subframes in DRX ON states any more. Therefore, when the base station does not schedule the terminal, no additional power consumption of the terminal side is caused objectively, that is, the power consumption of the terminal side is lowered.

BRIEF DESCRIPTION OF THE DRAWINGS

The accompanying drawings described herein are intended to provide a further understanding of the present disclosure and constitute one part of the present disclosure. The schematic embodiments of the present disclosure and their descriptions are used to explain the present disclosure and do not constitute any improper limitation to the present disclosure. In the accompanying drawings.

DETAILED DESCRIPTION OF THE EMBODIMENTS

In an invention process, inventors notice that:

in a current LTE system, a Transmission Time Interval (TTI) length is fixed to be 1 ms, and one or more PDCCHs are transmitted on first N OFDM symbols of each TTI, or on a set of PRB pair in a data area, or on a plurality of continuous/discontinuous sub-frames. UE blind checks its own PDCCH in a Cell-specific Search Space (CSS) or UE-specific search space (USS) according to desired information. This may cause additional resource overheads when a downlink control channel is blind checked in a control area of each non-DRX subframe, because a terminal is not scheduled at all non-DRX subframes.

However, with the development of mobile technologies, mobile communication systems in the future need to provide lower network latency and support more service types, which may lead to higher demand for terminal energy consumption. In the current LTE system, the terminal needs to detect and receive a downlink control channel at all subframes in DRX ON states. Therefore, when a base station does not schedule the terminal, additional power consumption on a terminal side is caused. However, currently, there is no clear plan on reducing power consumption of the terminal at a data transmission-free subframe, and therefore, embodiments of the present disclosure provide solutions for indicating downlink control channel detection and for downlink control channel detection. The following describes specific implementation manners of the present disclosure with reference to the accompanying drawings.

In a description process, implementation is described from a terminal side and a base station side, respectively. An indication process is described from the base station side, and a detection process is described from a UE side. Then, an example of the implementation of the combination of the indication and the detection is given to better understand the implementation of the solutions provided by the embodiments of the present disclosure. The description manner does not mean that the indication and the detection can be implemented together or separately. In fact, when the terminal and the base station perform separately, problems at the terminal side and the base station side are resolved, respectively. When the two are used together, a better technical effect is achieved.

In the solution, the base station informs, by explicitly indicating signaling, whether the terminal needs to detect and receive the downlink control channel within one or more TTIs. Because the terminal side and the base station side are corresponding with each other and have corresponding processing manners, repeated parts are not described again.

Figure 1:
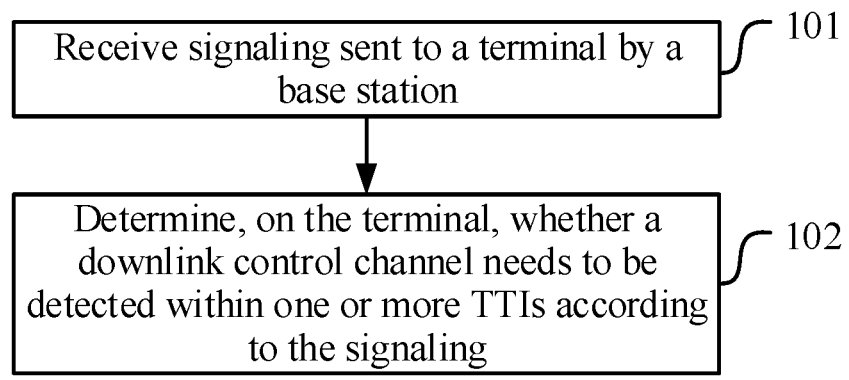
FIG. 1 is a schematic diagram of an implementation process of a method for downlink control channel detection on a terminal side according to an embodiment of the present disclosure.

FIG. 1 is a schematic diagram of an implementation process of a method for downlink control channel detection on a terminal side. As shown in the diagram, the method may include:

step 101: receiving signaling sent to a terminal by a base station; and step 102: on the terminal, determining whether a downlink control channel needs to be detected within one or more TTIs according to the signaling.

Specifically, the terminal determines, according to the explicit signaling sent by the base station, whether it is necessary to detect and receive the downlink control channel within one or more TTIs. Generally, detection and reception are continuous actions. For example, when monitoring a PDCCH in a search space, the terminal needs to detect the PDCCH on different PDCCH candidates according to an agreed DCI format. A more specific action is that the terminal needs to cache entire data, and then detects and parses the data. Therefore, in order to better comply with the specific implementation, an expression of downlink control channel detection and reception is also used in description of specific implementation.

Two manners in the specific implementation are specially as follows:

Manner 1 in an implementation, the signaling is indicator information carried by a group common PDCCH.

In the specific implementation, the indicator information carried by the group common PDCCH is N-bit indicator information, and N is a positive integer greater than or equal to 1.

Specifically, the terminal receives the N-bit indicator information carried by the group common PDCCH, and determines whether it is necessary to detect the downlink control channel within one or more TTIs.

In the implementation, when N=1, if the indicator information is in a state 1, it indicates that the terminal needs to detect the downlink control channel within one or more TTIs; or if the indicator information is in a state 0, it indicates that the terminal does not need to detect the downlink control channel within one or more TTIs. Alternatively, when N>1, each bit of the N-bit information is used to indicate whether a downlink control channel in a TTI needs to be detected.

Specifically, N is a positive integer greater than or equal to 1.

When N=1, if the indicator information is in a state 1, it indicates that the terminal needs to detect and receive the downlink control channel within one or more slots; or if the indicator information is in a state 0, it indicates that the terminal does not need to detect and receive the downlink control channel within one or more slots. Alternatively, when N>1, each bit of N-bit information indicates detection and reception of the downlink control channel within one slot. For example, a first information bit indicates whether the terminal needs to detect and receive the downlink control channel within a slot n, a second information bit indicates whether the terminal needs to detect and receive the downlink control channel within a slot n+1, and so on.

Manner 2 in an implementation, the signaling is indicator information sent at a specific resource location.

Specifically, a terminal receives indicator information about detection of a downlink control channel at a specific resource location.

In the specific implementation, the signaling is indicator information sent at a specific resource location, wherein the specific resource location is configured by a base station for the terminal by using higher layer signaling.

Specifically, the specific resource location is configured for the terminal by the base station through higher layer signaling.

In the implementation, when the signaling is the indicator information sent at the specific resource location, the indicator information is detected on the specific resource within each TTI or every M TTIs, to determine whether it is necessary to detect the downlink control channel, wherein M is an integer greater than 1.

Specifically, the indicator information includes N-bit information. For example, N=1 bit. Within each TTI, the indicator information is first detected on the specific resource.

After receiving the indicator information, the terminal determines whether it is necessary to detect and receive the downlink control channel within the TTI. For example, when the indicator information is in a state 1, the terminal needs to detect and receive the downlink control channel within the TTI; or when the indicator information is in a state 0, the terminal does not need to detect and receive the downlink control channel within the TTI.

In the implementation, the manner in which the indicator information is detected on the specific resource per M TTIs means that the specific resource occurs once per M TTIs, that is, the terminal does not need to receive the indicator information within each TTI.

In the implementation, the TTI is a slot or a mini-slot.

In the implementation, the indicator information is realized through independent coding; or the indicator information is processed in the same manner as the downlink control channel and transmitted in a PDCCH channel structure.

Specifically, the indicator information is realized through independent coding, such as, repeated coding, block coding, or manners different from control channel coding.

Alternatively, the indicator information is processed in the same manner as the downlink control channel and transmitted in a PDCCH channel structure. For example, a DCI format X is introduced to carry the indicator information. The DCI format is transmitted on a specified resource by using a fixed aggregation level.

Figure 2:
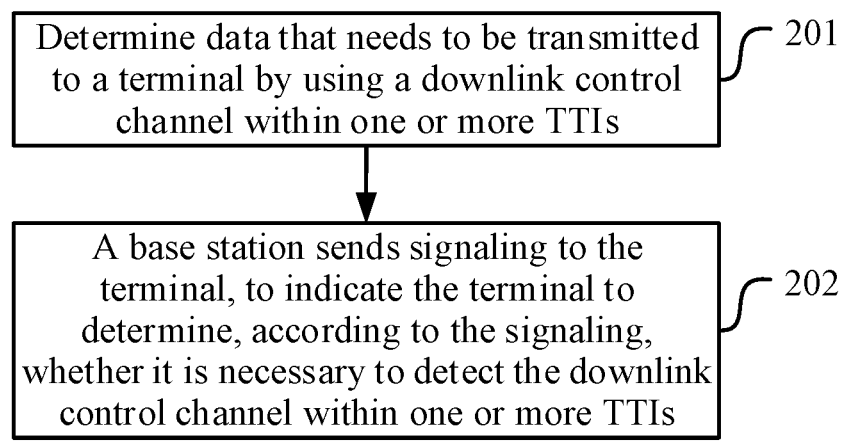
FIG. 2 is a schematic diagram of an implementation process of a method for indicating downlink control channel detection on a base station side according to an embodiment of the present disclosure.

FIG. 2 is a schematic diagram of an implementation process of a method for indicating downlink control channel detection on a base station side. As shown in the diagram, the method may include:

step 201: determining data that needs to be transmitted to a terminal by using a downlink control channel within one or more TTIs; and step 202: sending signaling to the terminal by a base station, to indicate the terminal to determine, according to the signaling, whether it is necessary to detect the downlink control channel within one or more TTIs.

Specifically, the base station sends explicit signaling, to indicate whether the terminal needs to detect and receive a downlink control channel transmitted by scheduled data within one or more TTIs.

Correspondingly, two manners in specific implementation are specially as follows.

Manner 1 in an implementation, the signaling is indicator information carried by a group common PDCCH.

In the specific implementation, the indicator information carried by the group common PDCCH is N-bit indicator information, and N is a positive integer greater than or equal to 1.

Specifically, the base station sends indicator information for blind detection of the downlink control channel through a group common PDCCH, to indicate whether the terminal needs to detect and receive the downlink control channel transmitted by the scheduled data within one or more TTIs.

In the implementation, when N=1, if the indicator information is in a state 1, it indicates that the terminal needs to detect the downlink control channel within one or more TTIs; or if the indicator information is in a state 0, it indicates that the terminal does not need to detect the downlink control channel within one or more TTIs. Alternatively, when N>1, each bit of the N-bit information is used to indicate whether a downlink control channel within a TTI needs to be detected.

Manner 2 in an implementation, the signaling is indicator information sent at a specific resource location.

Specifically, the base station indicates, according to the indicator information sent at the specific resource, whether the terminal needs to detect and receive a downlink control channel transmitted by scheduled data within one or more TTIs.

The specific resource is a set of resources that are configured for the terminal through higher layer signaling by the base station, and specific resources of different terminals may be the same or different.

When the specific resource is shared by a plurality of terminals, the terminals may send only one piece of common indicator information, and the terminals determine whether it is necessary to detect and receive the downlink control channel transmitted by the scheduled data within one or more TTIs according to the indicator information.

In the implementation, the signaling is indicator information sent at a specific resource location, wherein the specific resource location is configured by a base station for the terminal by using higher layer signaling.

In the implementation, when the signaling is the indicator information sent at the specific resource location, the indicator information is detected on the specific resource within each TTI or every M TTIs, to determine whether it is necessary to detect the downlink control channel.

In the implementation, the TTI is a slot or a mini-slot.

In the implementation, the indicator information is realized through independent coding; or the indicator information is processed in the same manner as the downlink control channel and transmitted in a PDCCH channel structure.

Specifically, the base station sends the indicator information at the specific resource location by using a structure the same as the downlink control channel, or an independent channel structure, or coding manners such as block coding and repeated coding.

Embodiment 1

Figure 3:
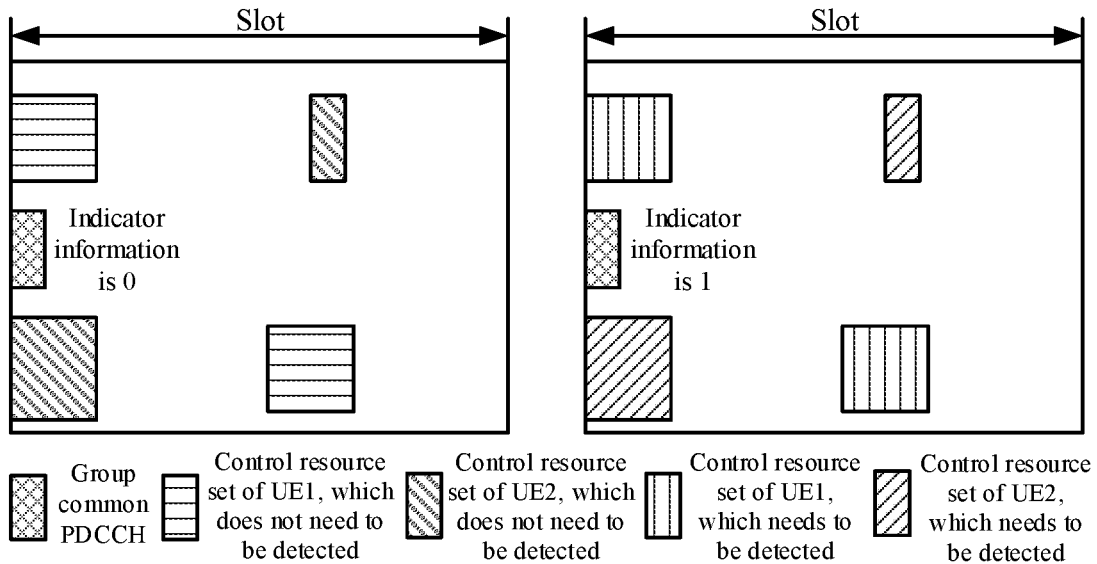
FIG. 3 is a schematic diagram of detection indicator according to Embodiment 1 of the present disclosure.

FIG. 3 is a schematic diagram of detection indicator in Embodiment 1. As shown in the diagram, it is assumed that one UE group includes two UE, namely UE1 and UE2, and it is assumed that the UE1 and the UE2 are configured with two control resource sets: {CORESET1-1, CORESET1-2} and {CORESET2-1, CORESET2-2}. Before detecting and receiving a downlink control channel in a corresponding control resource, the UE1 and the UE2 receive 1-bit indicator information transmitted on a group common PDCCH. The indicator information indicates whether a terminal in a group needs to detect and receive the downlink control channel within the slot.

It is assumed that, when the indicator information is in a state 1, it indicates that the UE1 and the UE2 need to detect and receive their own downlink control channels of scheduled data in the CORESET corresponding to the slot; or when the indicator information is in a state 0, it indicates that the UE1 and the UE2 do not need to detect and receive their own downlink control channels of scheduled data in the CORESET corresponding to the slot.

Certainly, the indicator information transmitted on the group common PDCCH may indicate detection and reception of downlink control channels of scheduled data within a plurality of slots, for example, detection and reception of downlink control channels within all slots in a group common PDCCH transmission cycle are informed.

Embodiment 2

Figure 4:
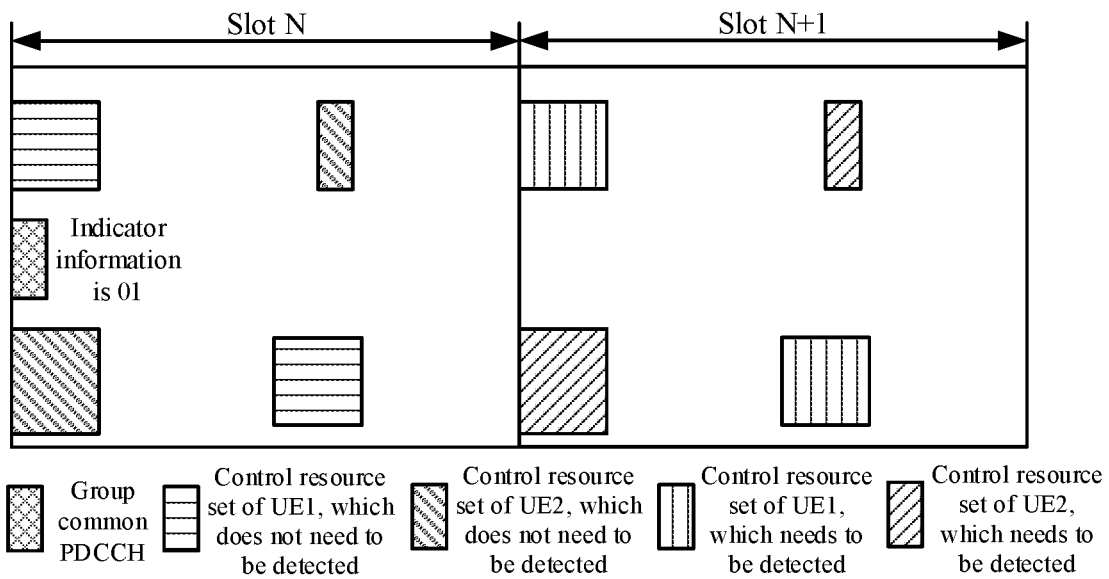
FIG. 4 is a schematic diagram of detection indicator according to Embodiment 2 of the present disclosure.

FIG. 4 is a schematic diagram of detection indicator in Embodiment 2. As shown in the diagram, it is assumed that one UE group includes two UE, namely UE1 and UE2, and it is assumed that the UE1 and the UE2 are configured with two control resource sets: {CORESET1-1, CORESET1-2} and {CORESET2-1, CORESET2-2}. Before detecting and receiving a downlink control channel in a corresponding control resource, the UE1 and the UE2 receive N-bit indicator information transmitted on a group common PDCCH. The N-bit indicator information indicates states of the UE1 and the UE2 for detection and reception of downlink control channels within N slots.

In the embodiment, it is assumed that N=2, each information bit corresponds to a detection state of a downlink control channel within a slot. The indicator information indicates whether a terminal in a group needs to detect and receive the downlink control channel within the slot. When the indicator information is in a state 1, it indicates that the UE1 and the UE2 need to detect and receive their own downlink control channels of scheduled data in the CORESET corresponding to the slot. When the indicator information is in a state 0, it indicates that the UE1 and the UE2 do not need to detect and receive their own downlink control channels of scheduled data in the CORESET corresponding to the slot. When the indicator information is in a 0 state 1, it indicates that the UE1 and the UE2 do not need to detect downlink control channels of scheduled data within a slot N, but need to detect downlink control channels of scheduled data within a slot N+1. For details, refer to FIG. 4. In the embodiment, the indicator information may further have other states. For details, refer to a Table 1 below.

TABLE 1

State and meaning of 2-bit indicator information.

| Indicator Information State | Meaning |
| --- | --- |
| 00 | The terminal does not need to detect the downlink control channels of scheduled data within the slot N and the slot N + 1. |
| 01 | The terminal does not need to detect the downlink control channel of scheduled data within the slot N, but needs to detect the downlink control channel of scheduled data within the slot N + 1. |
| 10 | The terminal needs to detect the downlink control channel of scheduled data within the slot N, but does not need to detect the downlink control channel of scheduled data within the slot N + 1. |
| 11 | The terminal needs to detect the downlink control channels of scheduled data within the slot N and the slot N + 1. |

Embodiment 3

Figure 5:
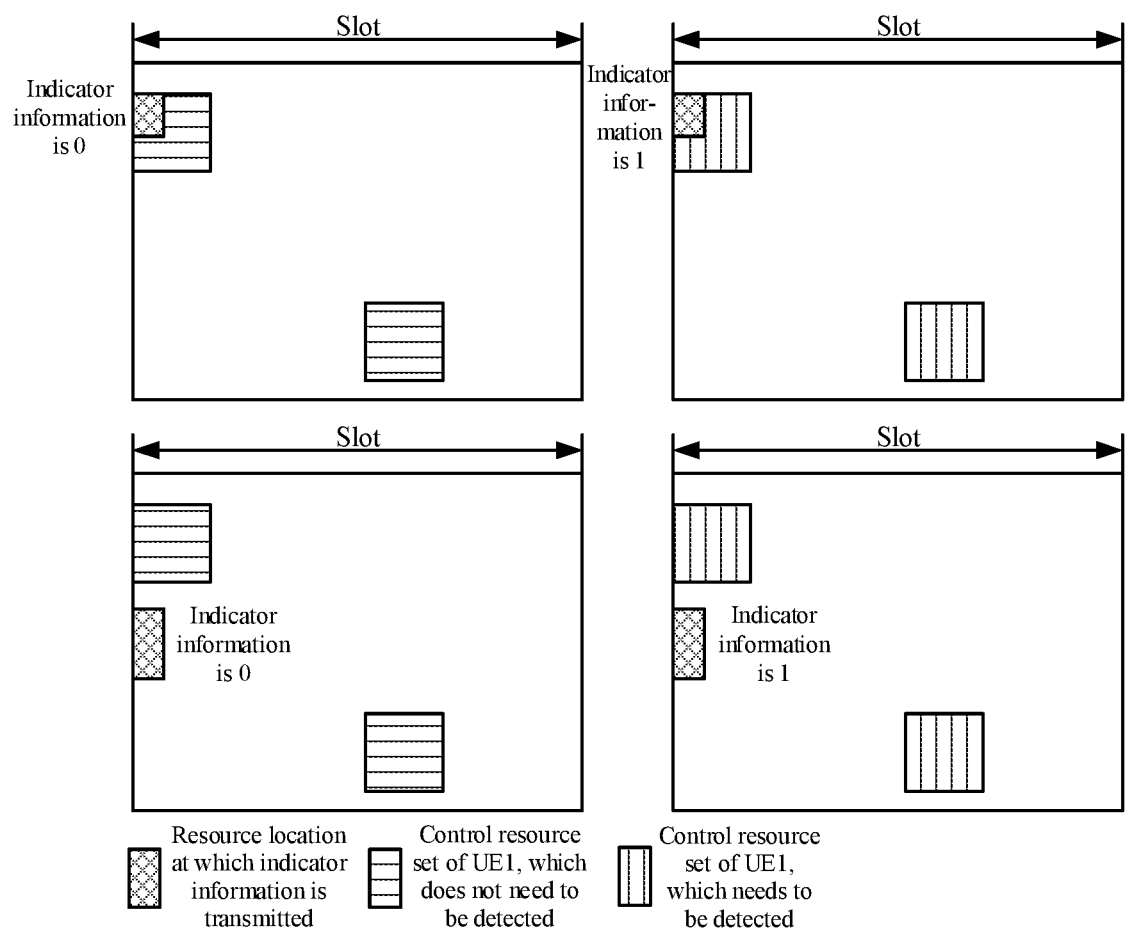
FIG. 5 is a schematic diagram of detection indicator according to Embodiment 3 of the present disclosure.

FIG. 5 is a schematic diagram of detection indicator in Embodiment 3. As shown in the diagram, a base station configures a specific resource for a terminal to transmit, detect and receive indicator information. In the embodiment, the base station configures a resource location for each terminal to transmit the indicator information. For example, the base station configures two CORESETs for the terminal, and assigns some resources in the CORESETs that are used to transmit the indicator information. Alternatively, a resource independent of the CORESETs is configured to transmit the indicator information.

The indicator information may be transmitted by reusing a PDCCH structure, or using an independent channel structure and coding manners (such as block coding and repeated coding). This is not limited in specific implementation.

The terminal first detects and receives the indicator information in a specific resource configured by higher layer signaling, and determines, according to the indicator information, whether to detect and receive a downlink control channel of scheduled data within the slot. For example, the indicator information is 1-bit, when the information is in a state 1, it indicates that the terminal needs to detect and receive the downlink control channel of scheduled data in a corresponding CORESET within the slot; or when the information is in a state 0, it indicates that the terminal does not need to detect and receive the downlink control channel of scheduled data in a corresponding CORESET within the slot. For details, refer to FIG. 5.

Certainly, the indicator information may also indicate detection and reception of downlink control channels of scheduled data within a plurality of slots.

Embodiment 4

Figure 6:
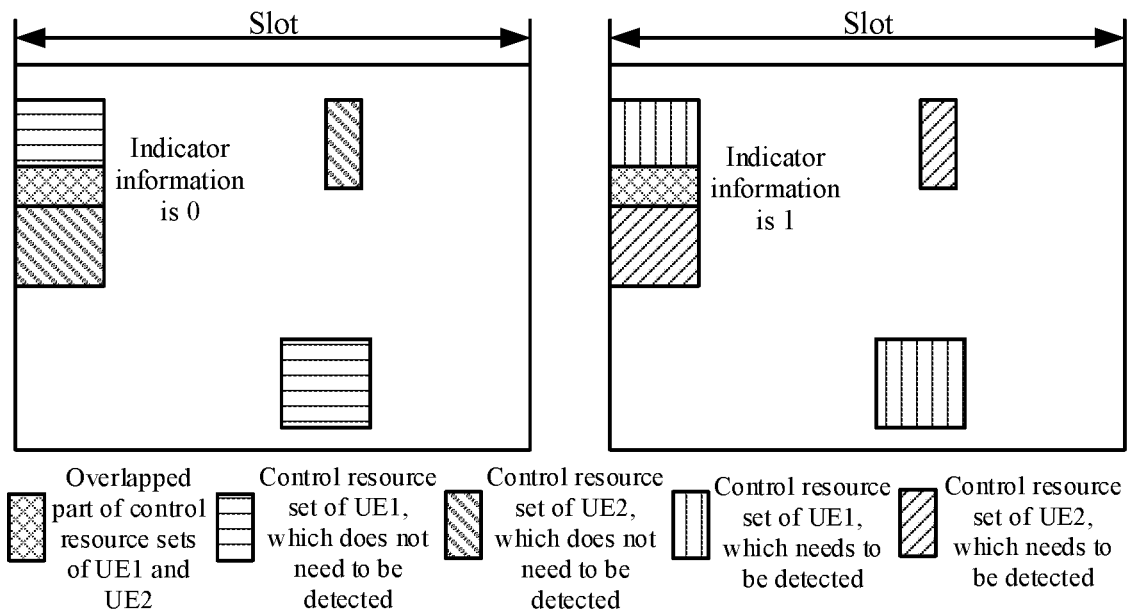
FIG. 6 is a schematic diagram of detection indicator according to Embodiment 4 of the present disclosure.

FIG. 6 is a schematic diagram of detection indicator in Embodiment 4. As shown in the diagram, based on Embodiment 3, it is assumed that CORESETs of UE1 and UE2 overlap, and indicator information about detection of a downlink control channel of scheduled data is transmitted in a common part. A base station informs a terminal of location of the overlapped resource. The UE1 and the UE2 first need to detect and receive the indicator information at the overlapped part. When the indicator information is in a state 0, the UE1 and the UE2 do not detect and receive a downlink control channel of scheduled data within the current slot; or when the indicator information is in a state 1, the UE1 and the UE2 need to detect and receive the downlink control channel of scheduled data within the current slot.

Based on a same inventive concept, embodiments of the present disclosure further relate to equipment for downlink control channel detection and indicating downlink control channel detection. Because principles of the equipment for solving problems are similar to principles of a method for downlink control channel detection and a method for indicating downlink control channel detection, implementation of the equipment may refer to implementation of the methods. Repeated parts are not described again.

Figure 7:
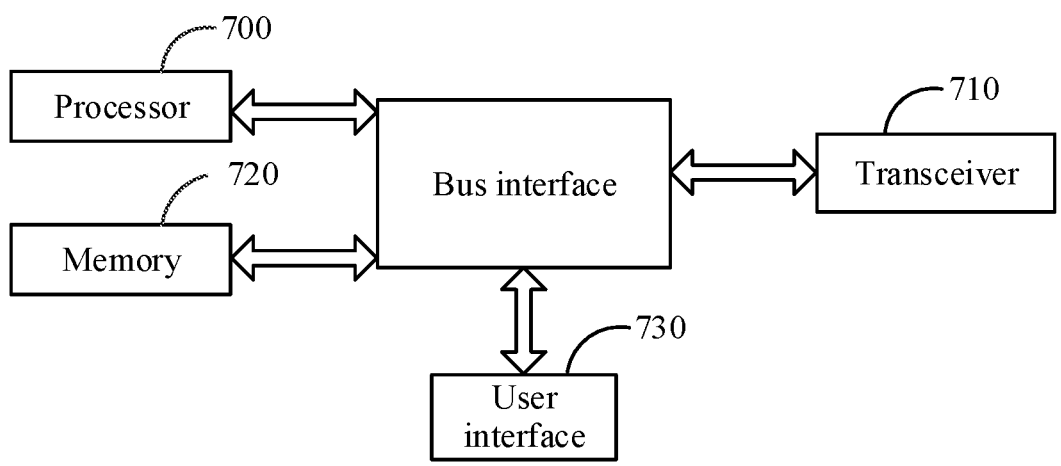
FIG. 7 is a schematic structural diagram of UE according to an embodiment of the present disclosure.

FIG. 7 is a schematic structural diagram of UE. As shown in the diagram, the user equipment includes:

a transceiver 710, configured to receive and send data under control of a processor 700, and perform the following process: receiving signaling sent to a terminal by a base station; and the processor 700, configured to read a program in a memory 720, and perform the following process: on the terminal, determining whether a downlink control channel needs to be detected within one or more TTIs according to the signaling.

In an implementation, the signaling is indicator information carried by a group common PDCCH.

In the implementation, the indicator information carried by the group common PDCCH is N-bit indicator information, and N is a positive integer greater than or equal to 1.

In the implementation, when N=1, if the indicator information is in a state 1, it indicates that the terminal needs to detect the downlink control channel within one or more TTIs; or if the indicator information is in a state 0, it indicates that the terminal does not need to detect the downlink control channel within one or more TTIs. Alternatively, when N>1, each bit of the N-bit information is used to indicate whether a downlink control channel in a TTI needs to be detected.

In the implementation, the signaling is indicator information sent at a specific resource location.

In the implementation, the signaling is indicator information sent at a specific resource location, wherein the specific resource location is configured by a base station for the terminal by using higher layer signaling.

In the implementation, when the signaling is the indicator information sent at the specific resource location, the indicator information is detected on the specific resource within each TTI or every M TTIs, to determine whether it is necessary to detect the downlink control channel.

In the implementation, the TTI is a slot or a mini-slot.

In the implementation, the indicator information is implemented through independent coding; or the indicator information is processed in the same manner as the downlink control channel and transmitted in a PDCCH channel structure.

In FIG. 7, a bus architecture may include any quantity of interconnecting buses and bridges, and specifically, various circuits of one or more processors represented by the processor 700 and a memory represented by the memory 720 are linked together. The bus architecture may further link various other circuits, such as a peripheral device, a voltage stabilizer, and a power management circuit. This is well known in the art, and therefore is not further described in the text. A bus interface provides an interface. A transceiver 710 may include a plurality of elements including a transmitter and a receiver, and provides a unit for communicating with various other apparatuses on a transmission medium. For different user equipment, a user interface 730 may alternatively be an interface for external and internal connection of required devices, and the connected devices include but not limited to a keypad, a monitor, a speaker, a microphone, a joystick, and the like.

The processor 700 is responsible for bus architecture management and general processing. The memory 720 may store data used when the processor 700 executes an operation.

Figure 8:
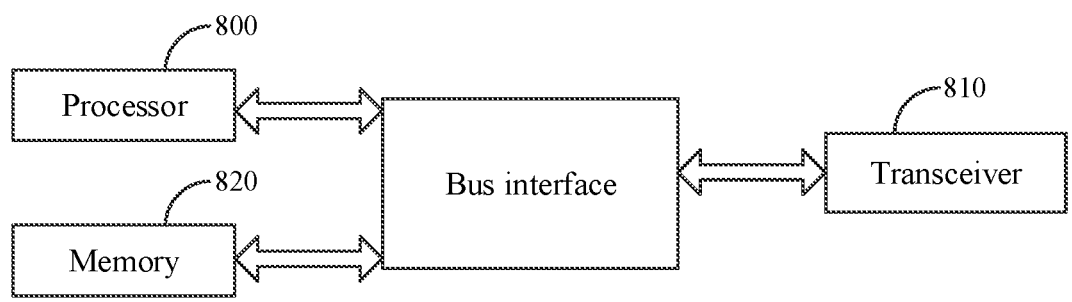
FIG. 8 is a schematic structural diagram of a base station according to an embodiment of the present disclosure.

FIG. 8 is a schematic structural diagram of a base station. As shown in the diagram, the base station includes:

a processor 800, configured to read a program stored in a memory 820, and perform the following process: determining data that needs to be transmitted to a terminal by using a downlink control channel within one or more TTIs; and a transceiver 810, configured to receive and send data under the control of the processor 800, and perform the following process: sending, by the base station, signaling to the terminal, to indicate the terminal to determine whether it is necessary to detect the downlink control channel within one or more TTIs according to the signaling.

In an implementation, the signaling is indicator information carried by a group common PDCCH.

In the implementation, the indicator information carried by the group common PDCCH is N-bit indicator information, and N is a positive integer greater than or equal to 1.

In the implementation, when N=1, if the indicator information is in a state 1, it indicates that the terminal needs to detect the downlink control channel within one or more TTIs; or if the indicator information is in a state 0, it indicates that the terminal does not need to detect the downlink control channel within one or more TTIs. Alternatively, when N>1, each bit of the N-bit information is used to indicate whether a downlink control channel in a TTI needs to be detected.

In the implementation, the signaling is indicator information sent at a specific resource location.

In the implementation, the signaling is indicator information sent at a specific resource location, wherein the specific resource location is configured by the base station to the terminal by using higher layer signaling.

In the implementation, when the signaling is the indicator information sent at the specific resource location, the indicator information is detected on the specific resource within each TTI or every M TTIs, to determine whether it is necessary to detect the downlink control channel.

In the implementation, the TTI is a slot or a mini-slot.

In the implementation, the indicator information is realized through independent coding; or the indicator information is processed in the same manner as the downlink control channel and transmitted in a PDCCH channel structure.

In FIG. 8, a bus architecture may include any quantity of interconnecting buses and bridges, and specifically, various circuits of one or more processors represented by the processor 800 and a memory represented by the memory 820 are linked together. The bus architecture may further link various other circuits, such as a peripheral device, a voltage stabilizer, and a power management circuit. This is well known in the art, and therefore is not further described in the text. A bus interface provides an interface. The transceiver 810 may include a plurality of elements including a transmitter and a receiver, and provides a unit for communicating with various other apparatuses on a transmission medium. The processor 800 is responsible for bus architecture management and general processing. The memory 820 may store data used when the processor 800 executes an operation.

Technical solutions provided in the embodiments of the present disclosure may be implemented in the following manners.

Figure 9:
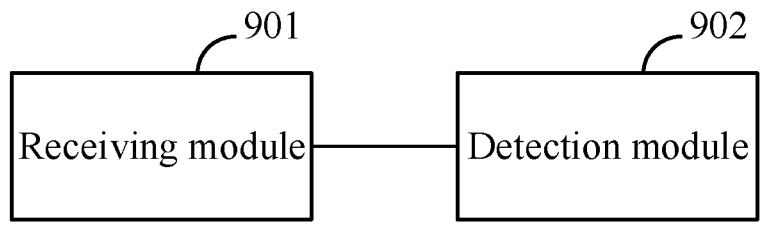
FIG. 9 is a schematic structural diagram of an apparatus for downlink control channel detection according to an embodiment of the present disclosure.

FIG. 9 is a schematic structural diagram of an apparatus for downlink control channel detection. As shown in the diagram, the apparatus may include:

a receiving module 901, configured to receive signaling sent to a terminal by a base station; and a detection module 902, configured to determine, on the terminal, whether a downlink control channel needs to be detected within one or more TTIs according to the signaling.

Figure 10:
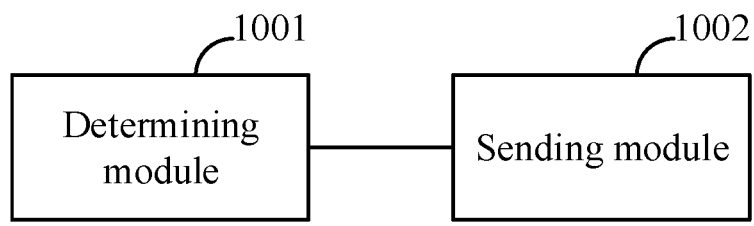
FIG. 10 is a schematic structural diagram of an apparatus for indicating downlink control channel detection according to an embodiment of the present disclosure.

FIG. 10 is a schematic structural diagram of an apparatus for indicating downlink control channel detection. As shown in the diagram, the apparatus may include:

a determining module 1001, configured to determine data that needs to be transmitted to a terminal by using a downlink control channel within one or more TTIs; and a sending module 1002, configured to send signaling to the terminal on a base station, to indicate the terminal to determine whether it is necessary to detect the downlink control channel within one or more TTIs according to the signaling.

For convenience of description, all parts of the above apparatus are divided into various modules or units by function, and are described separately. Certainly, in the implementation of the present disclosure, the functions of the modules or units may be implemented in one or more pieces of software or hardware.

In conclusion, through adoption of the technical solutions provided by the embodiments of the present disclosure, the terminal can determine whether it is necessary to detect and receive, within one or more TTIs, a downlink control channel of scheduled data, thereby further lowering energy consumption on a terminal side.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer usable program codes.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate a product that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. In this case, the present disclosure is also intended to cover these modifications and variations of the present disclosure provided that they fall within the scope of protection defined by claims of the present disclosure and equivalent technologies of the claims.

What is claimed is:

1. A downlink control channel detection method, comprising:

receiving signaling sent to a terminal by a base station; and determining, by the terminal, whether a downlink control channel needs to be detected within one or more Transmission Time Intervals (TTIs) according to the signaling;

wherein the signaling is indicator information carried by a group common Physical Downlink Control Channel (group common PDCCH); wherein the indicator information carried by the group common PDCCH is N-bit indicator information, and N is a positive integer greater than or equal to 1;

when N=1, under a condition that the indicator information is in a state 1, indicating the terminal to detect a downlink control channel within one or more TTIs; or under a condition that the indicator information is in a state 0, indicating the terminal not to detect a downlink control channel within one or more TTIs;

or when N>1, using each bit of the N-bit information to indicate whether a downlink control channel in a corresponding TTI of TTIs needs to be detected, the each bit of the N-bit information corresponds to one of TTIs and used for indicating whether a downlink control channel in the one of TTs needs to be detected.

2. The method according to claim 1, wherein the signaling is indicator information sent at a specific resource location;

wherein when the signaling is indicator information sent at a specific resource location, detecting the indicator information on the specific resource within each TTI or every M TTIs, to determine whether a downlink control channel needs to be detected, wherein M is an integer greater than 1; the TTI is a slot or a mini-slot;

wherein the indicator information is realized through independent coding; or the indicator information is processed in a same manner as a downlink control channel and transmitted in a PDCCH channel structure.

3. The method according to claim 2, wherein the signaling is indicator information sent at a specific resource location that is configured by a base station for a terminal by using higher layer signaling.

4. A method for indicating downlink control channel detection, comprising:

determining data that needs to be transmitted to a terminal within one or more TTIs by using a downlink control channel; and sending, by a base station, signaling to the terminal, to indicate the terminal to determine, according to the signaling, whether a downlink control channel needs to be detected within one or more TTIs;

wherein the signaling is indicator information carried by a group common PDCCH; wherein the indicator information carried by a group common PDCCH is N-bit indicator information, and N is a positive integer greater than or equal to 1;

when N=1, under a condition that the indicator information is in a state 1, the indicating the terminal to detect a downlink control channel within one or more TTIs; or under a condition that the indicator information is in a state 0, indicating the terminal not to detect a downlink control channel within one or more TTIs;

or when N>1, using each bit of the N-bit information to indicate whether a downlink control channel in a corresponding TTI of TTIs needs to be detected, the each bit of the N-bit information corresponds to one of TTIs and used for indicating whether a downlink control channel in the one of TTs needs to be detected.

5. The method according to claim 4, wherein the signaling is indicator information sent at a specific resource location;

wherein when the signaling is indicator information sent at a specific resource location, detecting the indicator information on the specific resource within each TTI or every M TTIs, to determine whether a downlink control channel needs to be detected, wherein M is an integer greater than 1; the TTI is a slot or a mini-slot;

wherein the indicator information is realized through independent coding; or the indicator information is processed in a same manner as a downlink control channel and transmitted in a PDCCH channel structure.

6. The method according to claim 5, wherein the signaling is indicator information sent at a specific resource location that is configured by a base station for a terminal by using higher layer signaling.

7. A user equipment, comprising:

a transceiver, configured to receive and send data under a control of a processor, and perform a following process: receiving signaling sent to a terminal by a base station; and the processor, configured to read a program stored in a memory, and perform a following process: determining, on the terminal, whether a downlink control channel needs to be detected within one or more TTIs according to the signaling;

wherein the signaling is indicator information carried by a group common PDCCH; wherein the indicator information carried by the group common PDCCH is N-bit indicator information, and N is a positive integer greater than or equal to 1;

when N=1, under a condition that the indicator information is in a state 1, indicating the terminal to detect a downlink control channel within one or more TTIs; or under a condition that the indicator information is in a state 0, indicating the terminal not to detect a downlink control channel within one or more TTIs;

or when N>1, using each bit of the N-bit information to indicate whether a downlink control channel in a TTI of TTIs needs to be detected, the each bit of the N-bit information corresponds to one of TTIs and used for indicating whether a downlink control channel in the one of TTs needs to be detected.

8. The user equipment according to claim 7, wherein the signaling is indicator information sent at a specific resource location;

wherein when the signaling is indicator information sent at a specific resource location, detecting the indicator information on the specific resource within each TTI or every M TTIs, to determine whether a downlink control channel needs to be detected, wherein M is an integer greater than 1; the TTI is a slot or a mini-slot;

wherein the indicator information is realized through independent coding; or the indicator information is processed in a same manner as a downlink control channel and transmitted in a PDCCH channel structure.

9. The user equipment according to claim 8, wherein the signaling is indicator information sent at a specific resource location that is configured by a base station for a terminal by using higher layer signaling.

10. A base station, comprising:

a processor, configured to read a program stored in a memory, and perform a following process: determining data that needs to be transmitted to a terminal by using a downlink control channel within one or more TTIs; and a transceiver, configured to receive and send data under a control of the processor, and perform a following process: sending, by a base station, signaling to the terminal, to indicate the terminal to determine whether a downlink control channel needs to be detected within one or more TTIs according to the signaling;

wherein the signaling is indicator information carried by a group common PDCCH; wherein the indicator information carried by the group common PDCCH is N-bit indicator information, and N is a positive integer greater than or equal to 1;

when N=1, under a condition that the indicator information is in a state 1, indicating the terminal detect a downlink control channel within one or more TTIs; or under a condition that the indicator information is in a state 0, indicating the terminal not to detect a downlink control channel within one or more TTIs;

or when N>1, using each bit of the N-bit information to indicate whether a downlink control channel in a TTI of TTIs needs to be detected, the each bit of the N-bit information corresponds to one of TTIs and used for indicating whether a downlink control channel in the one of TTs needs to be detected.

11. The base station according to claim 10, wherein the signaling is indicator information sent at a specific resource location;

wherein when the signaling is indicator information sent at a specific resource location, detecting the indicator information is detected on the specific resource within each TTI or every M TTIs, to determine whether a downlink control channel needs to be detected, wherein M is an integer greater than 1; the TTI is a slot or a mini-slot;

wherein the indicator information is realized through independent coding; or the indicator information is processed in a same manner as a downlink control channel and transmitted in a PDCCH channel structure.

12. The base station according to claim 11, wherein the signaling is indicator information sent at a specific resource location that is configured by the base station for a terminal by using higher layer signaling.

* * * * *